(No Model.)

F. M. McKOWN.
MEAT PRESS.

No. 602,866. Patented Apr. 26, 1898.

WITNESSES:
Edwin L. Bradford
Wm. G. Griffin

INVENTOR
Florance M. McKown
BY
Ralph Wormell
ATTORNEY.

UNITED STATES PATENT OFFICE.

FLORANCE M. McKOWN, OF BOOTHBAY, MAINE.

MEAT-PRESS.

SPECIFICATION forming part of Letters Patent No. 602,866, dated April 26, 1898.

Application filed May 29, 1897. Serial No. 638,716. (No model.)

*To all whom it may concern:*

Be it known that I, FLORANCE M. MCKOWN, a citizen of the United States of America, residing at Boothbay, in the county of Lincoln and State of Maine, have invented certain new and useful Improvements in Meat-Presses, of which the following is a specification, reference being had therein to the accompanying drawings.

The present invention relates to handpresses, and more particularly to that class known as "meat-presses," and has for its objects the provision of a press which will possess advantages in point of simplicity, inexpensiveness, durability, and general efficiency.

With these objects in view the invention consists of the details of construction and arrangement, which will more fully appear hereinafter.

Figure 1:
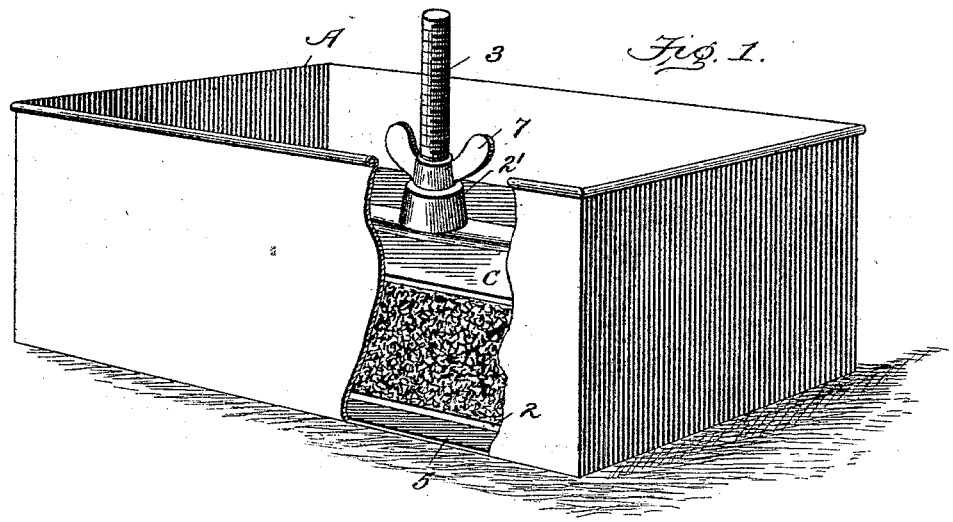
Figure 2:
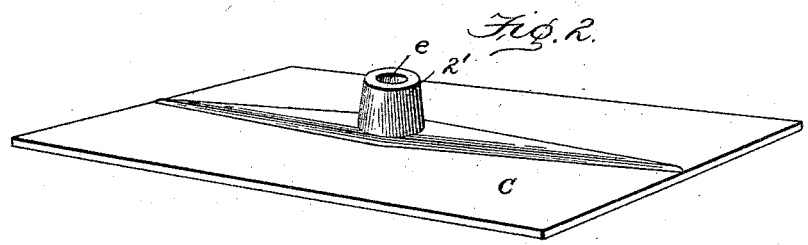
Figure 3:
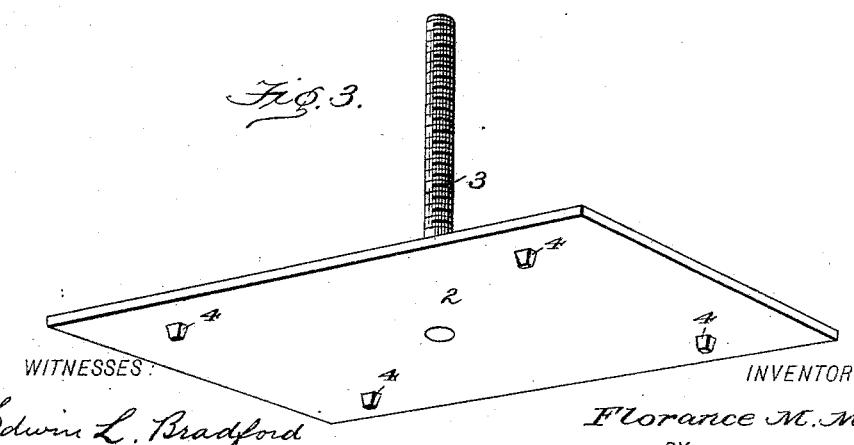

In the accompanying drawings, which form part of this application, Figure 1 is a perspective view of the device with parts broken away. Figs. 2 and 3 are details.

Like numerals and letters of reference indicate corresponding parts in the several views.

Referring to the drawings, the letter A represents the receptacle for holding the pressing device and the meat to be pressed and may be of any suitable shape and material.

B represents the pressing device, which consists of a base-plate 2, having screw-shaft 3 projecting upwardly therefrom, the said shaft being rigidly attached to the said base-plate. The bottom of the base-plate 2 is provided with short legs 4, which raises the base-plate up from the bottom 5 of the said receptacle and prevents it from coming in close contact with the said bottom. The object of this is to allow a space for receiving the liquor when extracted during the process of pressing. It will be seen that the said press is somewhat smaller than the receptacle A, thus allowing the liquor contained in the meat to run into the bottom of the receptacle A and also allow the press to be easily removed from the receptacle. A movable plate C, centrally apertured at e, is provided in the said plate, through which passes the screw-shaft 3. A winged nut 7, interiorly threaded, works over the said screw-shaft 3 and is the means by which the upper plate C is forced downwardly and the meat pressed. A hub 2' is integrally cast with the said upper plate and is very useful, especially for lifting the said upper plate out of the box when the winged nut 7 is released.

The many advantages of the above-described device is easily seen and the operation is readily understood by those skilled in the art to which it appertains.

Having thus described my invention, what I claim as new, and desire to secure by Letters Patent, is—

In combination, a meat-press consisting of a receptacle for holding the meat and the pressing mechanism, said pressing mechanism consisting of a base-plate having lugs upon the under side thereof, a screw projecting upwardly therefrom, a follower-plate adapted to be placed within said receptacle, and having a hub 2' threaded to engage the screw, a winged nut 7 working upon said screw, and adapted to force the follower-plate downward, substantially as set forth.

In testimony whereof I affix my signature in presence of two witnesses.

FLORANCE M. MCKOWN.

Witnesses:
ALONZO R. NICKERSON,
CYRUS A. THOMPSON.